US012662353B2

(12) United States Patent
Daniels et al.

(10) Patent No.: US 12,662,353 B2
(45) Date of Patent: Jun. 23, 2026

(54) ELEVATOR CAR SPACE ALLOCATION BASED ON DETECTING VOICES OF POTENTIAL PASSENGERS

(71) Applicant: OTIS ELEVATOR COMPANY, Farmington, CT (US)

(72) Inventors: Harrison Daniels, Avon, CT (US); Arthur Hsu, South Glastonbury, CT (US); Stephen Richard Nichols, Plantsville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1539 days.

(21) Appl. No.: 17/112,915

(22) Filed: Dec. 4, 2020

(65) Prior Publication Data

US 2022/0177269 A1 Jun. 9, 2022

(51) Int. Cl.

*B66B 5/00* (2006.01)
*B66B 1/18* (2006.01)
*B66B 1/34* (2006.01)
*B66B 1/46* (2006.01)

(52) U.S. Cl.

CPC .............. *B66B 5/0012* (2013.01); *B66B 1/18* (2013.01); *B66B 1/3423* (2013.01); *B66B 1/468* (2013.01); *B66B 2201/222* (2013.01); *B66B 2201/4646* (2013.01)

(58) Field of Classification Search

CPC ....... B66B 5/0012; B66B 1/18; B66B 1/3423; B66B 1/468; B66B 2201/222; B66B 2201/4646

See application file for complete search history.

(56) References Cited

U.S. PATENT DOCUMENTS

2010/0219025 A1* 9/2010 Laihanen .............. B66B 1/2458 187/387
2015/0329316 A1* 11/2015 Lee ....................... B66B 1/2458 187/382
2017/0291792 A1* 10/2017 Scoville ................ B66B 1/3407

* cited by examiner

*Primary Examiner* — Jianchun Qin

(74) *Attorney, Agent, or Firm* — Carlson, Gaskey & Olds, P.C.

(57) ABSTRACT

An illustrative example embodiment of a device includes an elevator passenger interface configured to allow a passenger to place a call for elevator service by indicating at least one of an intended destination and an intended direction. The elevator passenger interface includes at least one sound detector. A processor is configured to determine a number of passengers intending to travel to the intended destination or in the intended direction based on at least an indication from the sound detector regarding voice detection and to associate the determined number of passengers with the call.

22 Claims, 2 Drawing Sheets

ELEVATOR CAR SPACE ALLOCATION BASED ON DETECTING VOICES OF POTENTIAL PASSENGERS

BACKGROUND

Elevator systems have proven useful for carrying passengers between different levels in a building. For many years an individual desiring elevator service would indicate an intended direction of travel from a particular floor by pressing a hall call button. In response to such a call the elevator system controller would determine whether the passenger intended to travel up or down from the boarding floor and direct a car to that floor, illuminate a direction light near the entrance to the car, and open the door so the passenger could board. Once in the elevator car the passenger would be able to indicate an intended destination floor through a car operating panel, which typically includes a set of buttons corresponding to the potential destination floors.

Advances in technology have allowed for elevator systems to become more sophisticated or versatile. For example, destination entry systems allow passengers to enter an intended destination prior to entering an elevator car. An elevator dispatch controller determines which elevator car will most efficiently service each such request and assigns an elevator car for each passenger. The car assignment process usually includes considering whether sufficient room is available in a candidate car based on the number of passengers assigned to that car. Once a suitable car is identified, there are various known techniques to notify the passenger which car has been assigned to travel to the intended destination.

One challenge associated with destination entry systems is that not every individual desiring service will place a call. Instead, for example, if several people intend to travel together in an elevator car oftentimes only one of them will place the call. The dispatch controller typically does not have the ability to determine whether additional passengers will accompany the individual who placed the call. There may not be adequate room on an elevator car that is assigned to several passengers when, in reality, several more intend to board that car. This scenario is particularly challenging in peak traffic situations when many people desire elevator service at or around the same time and passengers may be frustrated that the assigned car fills up before they are able to board.

SUMMARY

An illustrative example embodiment of a device includes an elevator passenger interface configured to allow a passenger to place a call for elevator service by indicating at least an intended destination or an intended direction. The elevator passenger interface includes at least one sound detector. A processor is configured to determine a number of passengers intending to travel to the intended destination or in the intended direction based on at least an indication from the sound detector regarding voice detection and to associate the determined number of passengers with the call.

In addition to one or more of the features described above, or as an alternative, the elevator passenger interface receives the call through the at least one sound detector.

In addition to one or more of the features described above, or as an alternative, the processor is configured to determine the number of passengers based on the indication from the sound detector indicating a number of unique voice signatures detected by the sound detector, or a number of directions from which voices were detected by the sound detector, or both of the number of unique voice signatures and the number of directions.

In addition to one or more of the features described above, or as an alternative, the processor is configured to determine the number of passengers by interpreting words spoken by at least one of the number of passengers after the call is placed.

In addition to one or more of the features described above, or as an alternative, the words spoken indicate a desire to be included as one of the number of passengers associated with the call.

In addition to one or more of the features described above, or as an alternative, the device includes a dispatch controller configured to assign at least one elevator car to the call, the processor communicates the number of passengers associated with the call to the dispatch controller, and the dispatch controller performs at least one function in response to the number of passengers communicated by the processor.

In addition to one or more of the features described above, or as an alternative, the at least one function comprises at least: determining a number of elevator cars needed to carry the number of passengers in the intended direction or to the intended destination, adjusting a number of elevator cars assigned to arrive at a landing where the number of passengers are expected to board an elevator car, including the number of passengers within an expected number of passengers on an elevator car assigned to the call, or communicating with the processor to cause the elevator passenger interface to provide a notification to the number of passengers that less than all of the number of passengers can be associated with the call.

In addition to one or more of the features described above, or as an alternative, the notification includes instructions to separately enter a call for each of the number of passengers.

In addition to one or more of the features described above, or as an alternative, the processor is configured to determine the number of detected voices between a time that the call is received and occurrence of a preselected event; and the preselected event is one of expiration of specified time period that began when the call was received, another call being received by the passenger interface, an assigned elevator car arriving in response to the call, or the passenger interface providing a response regarding the call.

In addition to one or more of the features described above, or as an alternative, the elevator passenger interface is inside an elevator car, and the processor determines a number of passengers on the elevator car based at least in part on the number of voices detected by the sound detector.

An illustrative example embodiment of a method of processing a call for elevator service includes: receiving a call for elevator service by an elevator passenger interface, the call indicating at least an intended destination or an intended direction; detecting voices in a vicinity of the elevator passenger interface; determining a number of passengers intending to travel to the intended destination or in the intended direction based on at least an indication regarding voice detection; and associating the determined number of passengers with the call.

In addition to one or more of the features described above, or as an alternative, the method includes receiving the call through at least one sound detector.

In addition to one or more of the features described above, or as an alternative, determining the number of passengers comprises determining from the indication regarding voice detection a detected number of unique voice signatures, or a number of directions from which voices were detected by the sound detector, or both of the number of unique voice signatures and the number of directions.

In addition to one or more of the features described above, or as an alternative, determining the number of passengers comprises interpreting words spoken by at least one of the number of passengers after receiving the call.

In addition to one or more of the features described above, or as an alternative, the words spoken indicate a desire to be included as one of the number of passengers associated with the call.

In addition to one or more of the features described above, or as an alternative, the method includes assigning at least one elevator car to the call and performing at least one function in response to the determined number of passengers.

In addition to one or more of the features described above, or as an alternative, the at least one function comprises at least: determining a number of elevator cars needed to carry the number of passengers in the intended direction or to the intended destination, adjusting a number of elevator cars assigned to arrive at a landing where the number of passengers are expected to board an elevator car, including the number of passengers within an expected number of passengers on the at least one elevator car assigned to the call, or providing a notification to the number of passengers that less than all of the number of passengers can be associated with the call.

In addition to one or more of the features described above, or as an alternative, the notification includes instructions to separately enter a call for each of the number of passengers.

In addition to one or more of the features described above, or as an alternative, the method includes determining the number of detected voices between a time that the call is received and occurrence of a preselected event, and wherein the preselected event is one of expiration of specified time period that began when the call was received, another call being received by the passenger interface, an assigned elevator car arriving in response to the call, or the passenger interface providing a response regarding the call.

In addition to one or more of the features described above, or as an alternative, receiving the call occurs inside an elevator car, and the method includes determining a number of passengers on the elevator car based at least in part on the number of voices detected by the sound detector.

The various features and advantages of at least one disclosed example embodiment will become apparent to those skilled in the art from the following detailed description. The drawings that accompany the detailed description can be briefly described as follows.

DETAILED DESCRIPTION

Embodiments of this invention provide the ability to determine how many passengers are likely to board an elevator car to travel to a particular destination even when less than all of the potential passengers have provided an indication of an intended destination prior to entering an elevator car based on detecting a number of voices. The determined number of passengers enhances the ability to accommodate passengers using an appropriate number of elevator cars.

Figure 1:
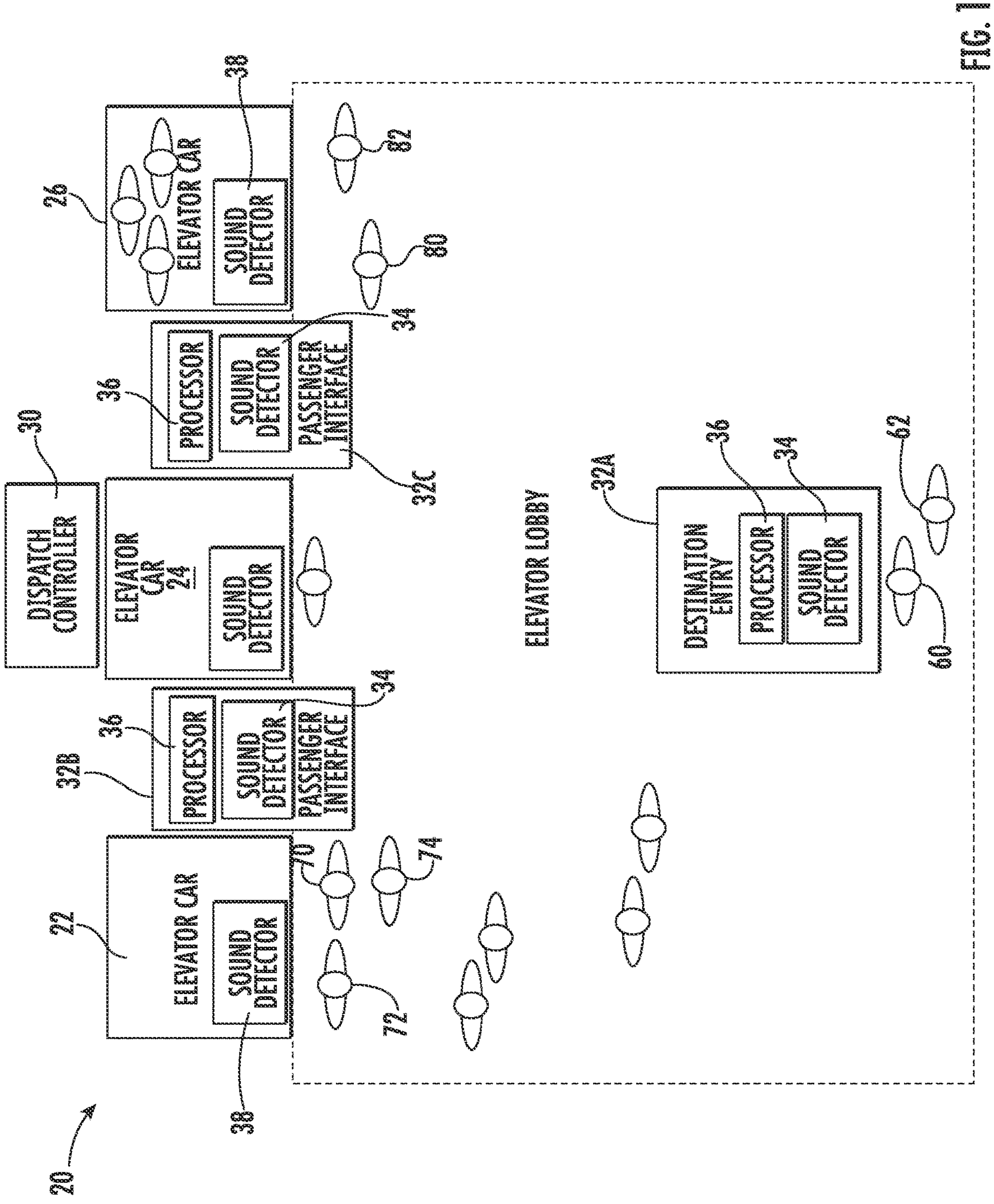
FIG. 1 schematically illustrates selected portions of an elevator system designed according to an embodiment of this invention and an example scenario in which the example elevator system determines how many passengers intend to travel together.

FIG. 1 schematically illustrates selected portions of an elevator system 20. Elevator cars 22, 24 and 26 are configured to carry passengers among various building levels, for example. A dispatch controller 30 is configured to assign one of the elevator cars 22, 24, or 26 to a request for elevator service.

Passenger interfaces 32 allow passengers to place calls for elevator service. The illustrated arrangement includes a passenger interface 32A that is a destination entry interface situated in an elevator lobby a selected distance from the elevator cars 22-26. The destination entry passenger interface 32A includes a sound detector 34 that is configured to detect sounds, such as human voices, in a near vicinity of the passenger interface 32A. In the illustrated example embodiment, the sound detector 34 includes a microphone and the destination entry passenger interface is optionally capable of receiving audible, spoken calls requesting elevator service. A call placed at the passenger interface 32A includes an indication of an intended destination of the passenger.

A processor 36 determines information regarding the call including the intended destination. The dispatch controller 30 processes the information determined by the processor 36 regarding the call and assigns an appropriate elevator car 22-26 to the call. The passenger interface 32A provides an indication of the assigned elevator car to the passenger so the passenger knows which of the elevator cars to board to be carried to the intended destination.

The illustrated example arrangement includes passenger interfaces 32B and 32C closer to the entrances to the elevator cars. The passenger interfaces 32B and 32C also include a respective sound detector 34, such as a microphone, and a processor 36. In this example embodiment, the passenger interfaces 32B and 32C allow a passenger to place a call for elevator service by indicating an intended destination, such as a specific floor, or an intended direction of travel, such as up or down. The passenger interfaces 32B and 32C are optionally capable of receiving audible, spoken calls requesting elevator service.

In the illustrated example the elevator cars 22-26 each include a sound detector 38. The dispatch controller 30 uses information regarding detected voices in the elevator cars to assist the dispatch controller in having an accurate count of the number of passengers in each elevator car.

Figure 2:
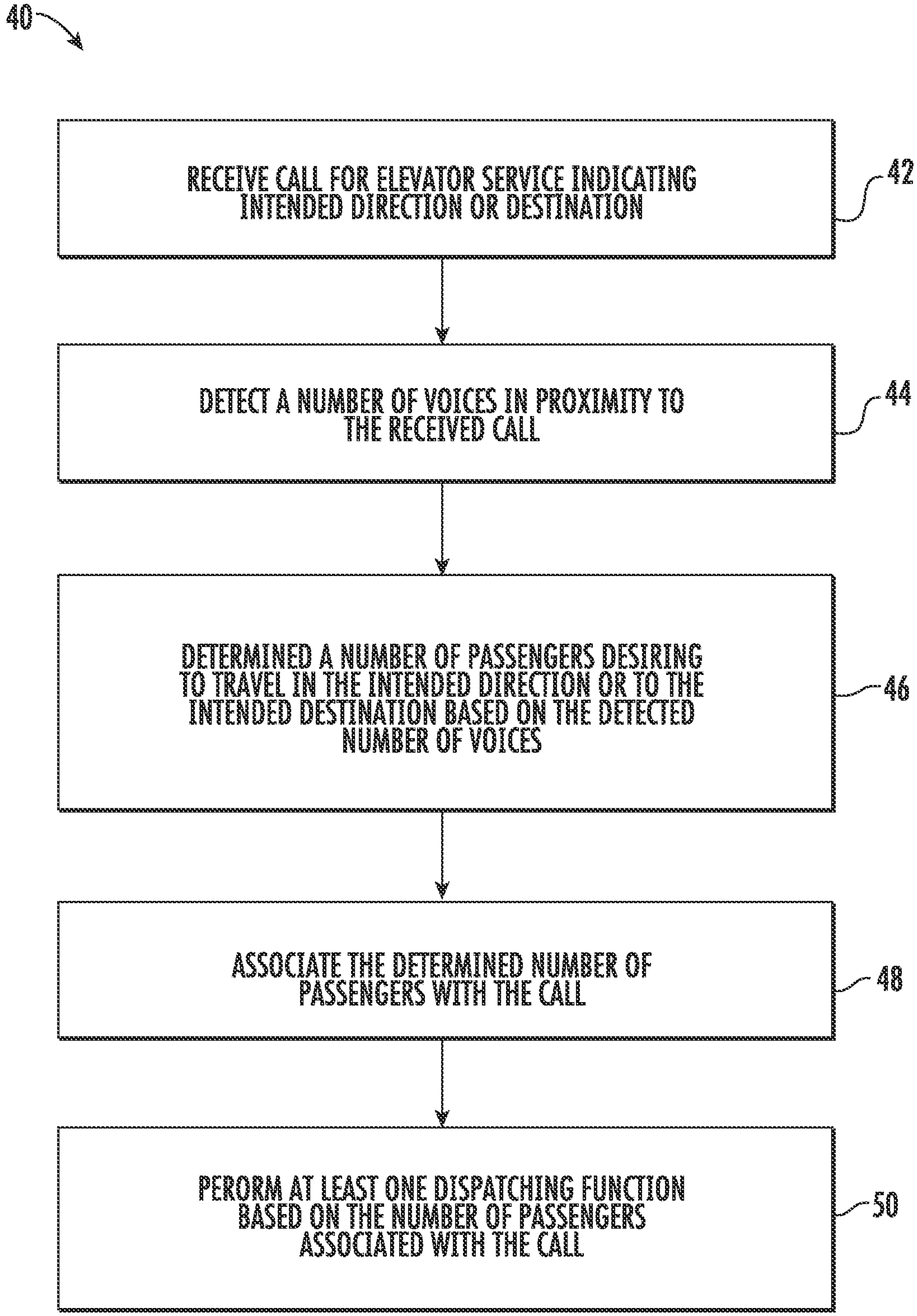
FIG. 2 is a flow chart diagram summarizing an example method of processing a call for elevator service based on detecting voices of passengers that intend to travel together.

FIG. 2 is a flow chart diagram 40 summarizing an example technique for processing passenger calls. At 42, a passenger interface 32 receives a call for elevator service indicating at least an intended destination or an intended direction of travel. At 44, the sound detector 34 of the corresponding passenger interface 32 detects voices in a vicinity or proximity of the passenger interface 32. The sound detector 34 in some embodiments is configured to detect different or distinct voices, such as by voice signature, and to provide an indication of a number of distinct, detected voices. In some embodiments the sound detector 34 is configured to detect voices based on a direction between the detector 34 and an individual whose voice is detected. Different detection directions are interpreted by the processor 36 as different voices belonging to different passengers. The number of detection directions is used as a number of detected voices in such embodiments. Some embodiments include a sound detector 34 and processor 36 that use a combination of the distinctiveness or uniqueness of a detected voice and directions that voices travel along toward the detector for detecting voices.

The sound detector 34 in the illustrated example embodiment will continue to detect voices within a selected period of time. For example, when a call is placed the sound detector 34 detects any number of voices for a few seconds following the call or a response provided by the passenger interface 32 in response to the call.

At 46, the processor 36 determines a number of passengers desiring to travel to the intended destination or in the intended direction based on voices detected by the sound detector 34, whether based on voice signature or detection direction. The determined number of passengers is not necessarily an exact number. In some situations, the processor 36 has sufficient information to determine an exact number of passengers based on detected voices but in other situations, the processor 36 determines an estimated number of passengers. At 48, the processor 36 associates a number of passengers with the call based at least in part on the detection of voices. Determining the number of passengers may be based on additional information available to or determined by the processor 36.

In one example embodiment, the processor 36 initiates the number of passengers associated with a call at a value of one when the call is recognized as having been received. When the call is audible, such as being spoken by the passenger, the processor 36 at least temporarily stores an indication of the requesting passenger's voice in memory. If at least one other voice or direction is detected by the sound detector 34 within a few seconds of the call being placed, the other voice or direction is used to increase the number of passengers associated with that call. For example, if two additional voices are detected, the processor 36 increments the number of passenger to a value of three and associates three passengers with the call.

Once a predetermined event occurs, the processor 36 stops determining if any additional voices were detected and communicates the call with the associated number of passengers to the dispatch controller 30. The predetermined event may be, for example, the expiration of specified time period that began when the call was received such as five seconds, another call being received by the passenger interface 32, the assigned elevator car arriving at the landing that is the origination floor of the requested service, or the passenger interface providing a response to the passenger regarding the call such as an indication of which elevator car 22-26 is assigned to the call. Other criteria defining an event at which the processor 36 stops considering whether to add another passenger to a request may be used.

The processor 36 communicates the call with the associated number of passengers to the dispatch controller 30 and, at 50, the dispatch controller 30 performs at least one dispatching function based on the number of passengers associated with the call. The dispatching function may vary depending on the circumstances. In most situations, the dispatch controller includes the number of associated passengers in the total number of passengers expected in an assigned elevator car. Including the associated number of passengers contributes to assigning elevator cars to calls in a manner that includes allocating adequate room in the car to accommodate the passengers expected to board that car.

The dispatch controller 30 performs a dispatching function under some circumstances that includes determining a number of elevator cars needed to carry the number of passengers in the intended direction or to the intended destination. In some situations, the dispatch controller 30 adjusts a number of elevator cars assigned to arrive at a landing where the number of passengers associated with at least one call are expected to board an elevator car. Sometimes, when necessary, the dispatch controller 30 communicates with the processor 36 to cause the elevator passenger interface 32 to provide a notification to the number of passengers that less than all of the number of passengers can be associated with the call. For example, if a car assigned to the call can accommodate two passengers and the processor associated four passengers with that call, the passengers should be notified that not all of them can be considered part of that call. In some embodiments, the passenger interface 32 then provides a suggestion for at least some of the passengers to separately enter a call to request elevator service.

FIG. 1 illustrates several example situations in which the dispatch controller 30 uses the determined number of passengers associated with a call, which may be an exact number or an estimated number as mentioned above. A passenger 60 places a call at the passenger interface 32A. Another passenger 62 speaks toward the sound detector 34 and indicates a desire to be included in that call. The sound detector 34 in this instance not only recognizes the difference in the voices of the passengers 60 and 62 but also captures the intentional, audible indication from the passenger 62 of the desire to travel with the passenger 60. The processor 36 in this instance determines that the number of passengers associated with that call is two.

In some embodiments, each processor 36 has access to information indicating which passenger voices already have a car assigned to an elevator car or are associated with a call. The processors 36 use such information to avoid associating a passenger with more than one call based on the voice of a passenger being detected after that passenger has already placed a call. In an example embodiment, all of the processors 36 have access to memory that at least temporarily stores information regarding voice signatures of voices that have been detected and associated with a call.

Another passenger 70 places a call through the passenger interface 32B. The sound detector 34 detects voices of additional passengers 72 and 74. The processor 36 determines that the voices of the passengers 72 and 74 were not associated with any other calls based on a comparison with voice signatures in the memory and associates them with the call placed by the passenger 70.

A passenger 80 places a call using the passenger interface 32C. The sound detector 34 of that interface detects the voices of the passenger 80 and another passenger 82. The passenger 82 had recently placed a call and the processor 36 determines that the voice of the passenger 82 is already associated with a call based on the information currently in the memory so the passenger 82 is not added to or associated with the call placed by the passenger 80.

In addition to detected voice information, some embodiments include utilizing other known characteristics of individuals to determine whether they are likely associated and will travel on the same elevator car to the same destination as an individual that actively places a call. For example, the processors 36 may have access to a database that includes associations and default destinations of individuals, such as employees of a particular business and the floor where each works. A voice signature of such individuals may be stored for comparison with that of a detected voice to assist in determining if a passenger who's voice has been detected is likely to desire to be included in a particular call. Such additional information is used in some embodiments as part of the process of determining whether an individual who did not place a call should be assigned to the same elevator car of another passenger.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device, comprising:

a plurality of elevator passenger interfaces configured to allow a passenger to place a call for elevator service by indicating at least an intended destination or an intended direction, each elevator passenger interface including at least one sound detector configured to detect different or distinct voices and to provide an indication of a number of distinct, detected voices; and a processor configured to determine a number of passengers intending to travel to the intended destination or in the intended direction based on at least an indication from the at least one sound detector regarding voice detection, and associate a determined number of passengers with the call, and wherein all processors of the plurality of elevator passenger interfaces have access to memory that at least temporarily stores information regarding voice signatures of the number of distinct, detected voices that have been detected and associated with the call to determine which passenger voices already have a car assigned.

2. The device of claim 1, wherein the each passenger interface receives the call through the at least one sound detector.

3. The device of claim 1, wherein the processor is configured to determine the number of passengers based on the indication from the at least one sound detector indicating:

a number of unique voice signatures detected by the at least one sound detector; or a number of directions from which voices were detected by the at least one sound detector; or both of the number of unique voice signatures and the number of directions.

4. The device of claim 1, wherein the processor is configured to determine the number of passengers by interpreting words spoken by at least one of the number of passengers after the call is placed.

5. The device of claim 4, wherein the words spoken indicate a desire to be included as one of the number of passengers associated with the call.

6. The device of claim 1, comprising a dispatch controller configured to assign at least one elevator car to the call, wherein the processor communicates the number of passengers associated with the call to the dispatch controller, and the dispatch controller performs at least one function in response to the number of passengers communicated by the processor.

7. The device of claim 6, wherein the at least one function comprises at least:

determining a number of elevator cars needed to carry the number of passengers in the intended direction or to the intended destination, adjusting a number of elevator cars assigned to arrive at a landing where the number of passengers are expected to board an elevator car, including the number of passengers within an expected number of passengers on an elevator car assigned to the call, or communicating with the processor to cause each elevator passenger interface to provide a notification to the number of passengers that less than all of the number of passengers can be associated with the call.

8. The device of claim 7, wherein the notification includes instructions to separately enter a call for each of the number of passengers.

9. The device of claim 1, wherein the processor is configured to determine the number of detected voices between a time that the call is received and occurrence of a preselected event; and the preselected event is one of expiration of specified time period that began when the call was received, another call being received by the elevator passenger interface, an assigned elevator car arriving in response to the call, or the elevator passenger interface providing a response regarding the call.

10. The device of claim 1, wherein at least one elevator passenger interface of the plurality of elevator passenger interfaces is inside an elevator car, and the processor determines a number of passengers on the elevator car based at least in part on the number of voices detected by the sound detector.

11. The device of claim 1, wherein:

the plurality of elevator passenger interfaces receive additional calls;

sound detectors associated with the plurality of elevator passenger interfaces detect voices of additional passengers associated with the additional calls;

voice signatures from the additional passengers are at least temporarily stored in the memory; and the processors associated with the plurality of elevator passenger interfaces determine whether voices of the additional passengers were associated with any other prior calls based on a comparison with voice signatures in the memory.

12. A method of processing a call for elevator service, the method comprising:

receiving a call for elevator service by one of a plurality of elevator passenger interfaces, the call indicating at least an intended destination or an intended direction;

detecting voices in a vicinity of the elevator passenger interface; determining a number of passengers intending to travel to the intended destination or in the intended direction based on at least an indication regarding voice detection;

at least temporarily storing in memory information regarding voice signatures of voices that have been detected and associated with the call from the plurality of elevator passenger interfaces to determine which passenger voices already have a car assigned;

accessing the memory to compare stored voice signatures with voice signatures associated with any additional incoming calls; and associating the determined number of passengers with the call.

13. The method of claim 12, comprising receiving the call through at least one sound detector.

14. The method of claim 12, wherein determining the number of passengers comprises determining from the indication regarding voice detection:

a detected number of unique voice signatures; or a number of directions from which voices were detected by at least one sound detector; or both of the number of unique voice signatures and the number of directions.

15. The method of claim 12, wherein determining the number of passengers comprises interpreting words spoken by at least one of the number of passengers after receiving the call.

16. The method of claim 15, wherein the words spoken indicate a desire to be included as one of the number of passengers associated with the call.

17. The method of claim 12, comprising:

assigning at least one elevator car to the call; and performing at least one function in response to the determined number of passengers.

18. The method of claim 17, wherein the at least one function comprises at least:

determining a number of elevator cars needed to carry the number of passengers in the intended direction or to the intended destination, adjusting a number of elevator cars assigned to arrive at a landing where the number of passengers are expected to board an elevator car, including the number of passengers within an expected number of passengers on the at least one elevator car assigned to the call, or providing a notification to the number of passengers that less than all of the number of passengers can be associated with the call.

19. The method of claim 18, wherein the notification includes instructions to separately enter a call for each of the number of passengers.

20. The method of claim 12, comprising determining the number of detected voices between a time that the call is received and occurrence of a preselected event, and wherein the preselected event is one of expiration of a specified time period that began when the call was received, another call being received by the passenger interface, an assigned elevator car arriving in response to the call, or the passenger interface providing a response regarding the call.

21. The method of claim 12, wherein receiving the call occurs inside an elevator car, and the method includes determining a number of passengers on the elevator car based at least in part on the number of voices detected by at least one sound detector.

22. The method of claim 12, wherein each elevator passenger interface includes at least one sound detector that detects voices in the vicinity of an associated elevator passenger interface, and a processor configured to determine the number of passengers intending to travel to the intended destination or in the intended direction based on at least an indication from the at least one sound detector regarding voice detection, and including:

receiving additional calls via the plurality of elevator passenger interfaces;

detecting voices of additional passengers via sound detectors associated with the plurality of elevator passenger interfaces;

at least temporarily storing in memory information regarding voice signatures of voices of the additional passengers; and using the processors associated with the plurality of elevator passenger interfaces to determine whether voices of the additional passengers were associated with any other calls based on a comparison with voice signatures stored in the memory.

* * * * *